US006848215B2

(12) United States Patent
Lawrie et al.

(10) Patent No.: US 6,848,215 B2
(45) Date of Patent: Feb. 1, 2005

(54) ASSEMBLY FOR ATTACHING A WINDOW REGULATOR MOTOR TO A WINDOW REGULATOR MECHANISM THROUGH A DOOR PANEL

(75) Inventors: Mark Graham Lawrie, Lion en Sulias (FR); Yann Le Gallo, Orleans (FR); Pascal De Vries, Sandillion (FR); Klaus B. Wilhelm Blume, Frankfurt (DE); Charles Berry Hopson, Lebanon, TN (US); Herve Laurandel, St. Claire (FR); Simon Blair Dobson, Kent (GB); Damien Cabanne, Fountainebleau (FR)

(73) Assignee: Meritor Light Vehicle Systems - France (FR)

( * ) Notice: Subject to any disclaimer, the term of this patent is extended or adjusted under 35 U.S.C. 154(b) by 2 days.

(21) Appl. No.: 10/054,718

(22) Filed: Oct. 25, 2001

(65) Prior Publication Data

US 2002/0100220 A1 Aug. 1, 2002

(30) Foreign Application Priority Data

Oct. 26, 2000 (GB) .............................................. 0026148

(51) Int. Cl.$^7$ .............................................. E05F 11/48
(52) U.S. Cl. ......................................... 49/352; 49/349
(58) Field of Search ........................ 49/352, 349, 348; 403/408.1; 411/389, 399, 424, 426

(56) References Cited

U.S. PATENT DOCUMENTS

| 3,373,528 A | * | 3/1968 | Tinder et al. .................. 49/349 |
| 3,396,996 A | * | 8/1968 | Raptis ..................... 403/408.1 |
| 3,706,236 A | * | 12/1972 | Pickles ...................... 74/89.11 |
| 3,803,793 A | * | 4/1974 | Dahl ........................ 403/408.1 |
| 4,004,371 A | * | 1/1977 | Podolan et al. ................ 49/352 |
| 4,191,060 A | * | 3/1980 | Sessa ......................... 74/89.22 |
| 4,216,624 A | * | 8/1980 | Blankenburg et al. ......... 49/352 |
| 4,306,378 A | * | 12/1981 | Fukura et al. ................. 49/352 |
| 4,577,402 A | * | 3/1986 | Swanstrom ................... 29/840 |
| 4,905,413 A | | 3/1990 | Kuki et al. |
| 4,928,531 A | * | 5/1990 | Schult et al. .................. 73/855 |
| 5,095,766 A | * | 3/1992 | Knappe et al. ............. 74/89.22 |
| 5,199,310 A | * | 4/1993 | Yoshimura ................... 74/89.2 |
| 5,261,759 A | * | 11/1993 | Decoux .................... 403/408.1 |

(List continued on next page.)

FOREIGN PATENT DOCUMENTS

| GB | 1 115 812 | 5/1968 |
| GB | 1 154 293 | 6/1969 |

(List continued on next page.)

OTHER PUBLICATIONS

Search Report dated Jan. 5, 2001.
European Search Report dated Feb. 13, 2002.

Primary Examiner—Gregory J. Strimbu
(74) Attorney, Agent, or Firm—Carlson, Gaskey & Olds

(57) ABSTRACT

An assembly includes a first, second and third components having respective first, second and third holes. The assembly further includes a locating feature assembled into the holes having a small portion and a large portion that provide a shoulder therebetween. The locating feature further includes a fixing portion near the small portion to secure the second component relative to the assembly and a fixing portion near the large portion to secure the third component relative to the assembly. The small portion is located in the second hole to align the locating feature relative to the second component, and the large portion is located in the third hole to align the locating feature relative to the third component. The second component is aligned relative to the third component, and the first component is situated between the second and third components and between the shoulder and the second component.

20 Claims, 1 Drawing Sheet

U.S. PATENT DOCUMENTS

| | | | | |
|---|---|---|---|---|
| 5,333,411 | A | * | 8/1994 | Tschirschwitz et al. ........ 49/352 |
| 5,564,231 | A | * | 10/1996 | Tajima et al. .................. 49/352 |
| 6,571,515 | B1 | * | 6/2003 | Samways et al. ............. 49/502 |
| 6,574,922 | B2 | * | 6/2003 | Velthaus et al. ............... 49/352 |
| 6,634,142 | B2 | * | 10/2003 | Dobson et al. ................ 49/352 |

FOREIGN PATENT DOCUMENTS

| | | |
|---|---|---|
| GB | 1 386 078 | 3/1975 |
| GB | 2 002 482 A | 2/1979 |
| GB | 1 594 689 | 8/1981 |
| JP | 6-173529 | 6/1994 |
| JP | 06 17 3529 | 6/1994 |
| JP | 9-49369 | 2/1997 |
| JP | 11-159244 | 6/1999 |
| JP | 11-286215 | 10/1999 |
| JP | 2000-248331 | 9/2000 |
| JP | 2000-265743 | 9/2000 |

* cited by examiner

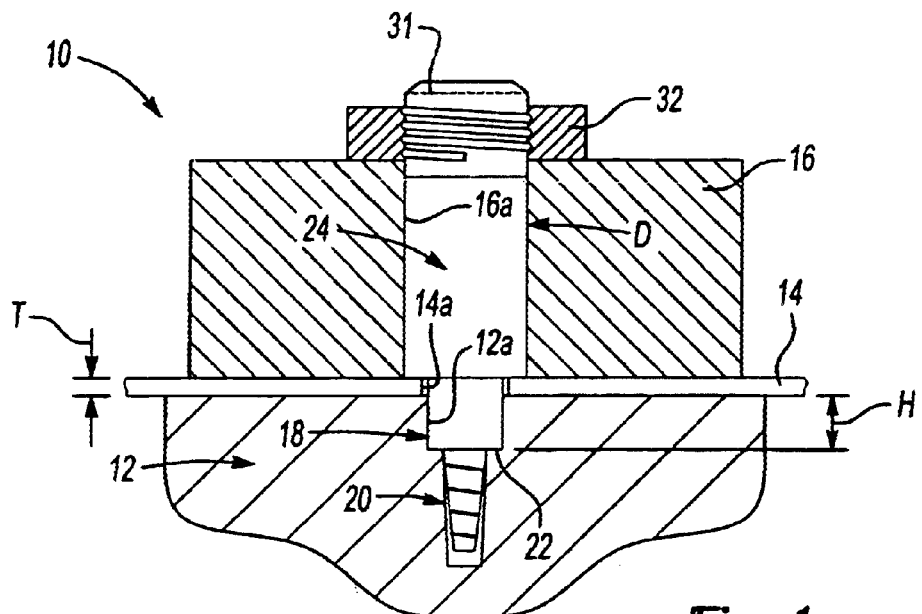
*Fig-1*
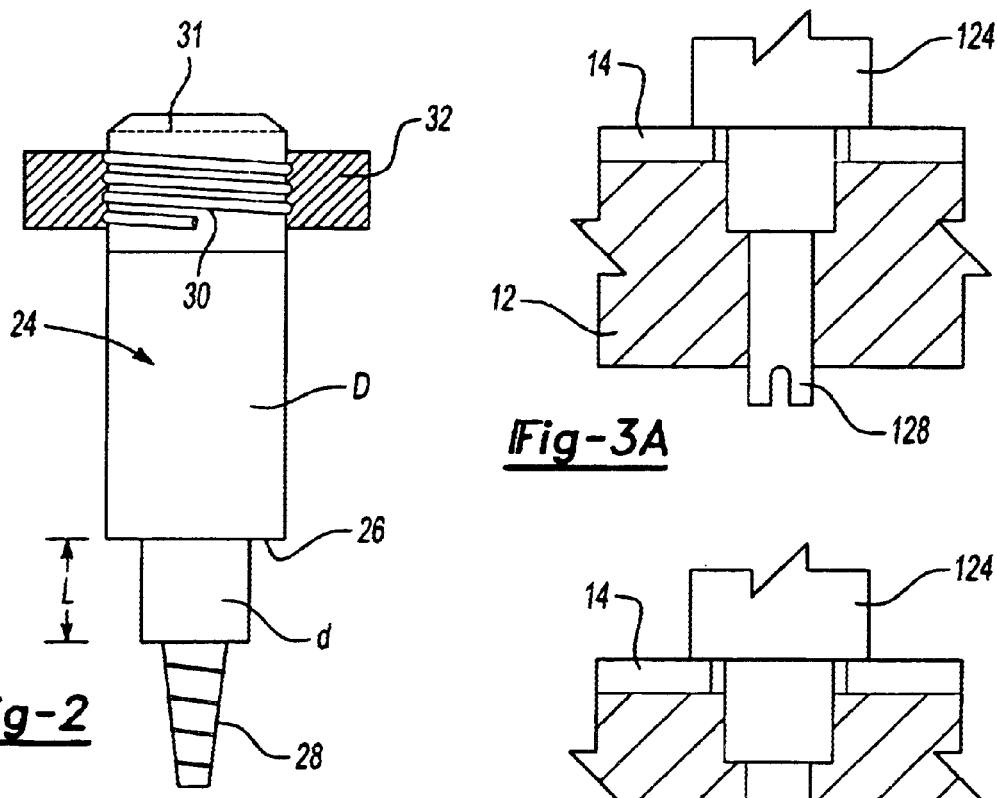
*Fig-2*
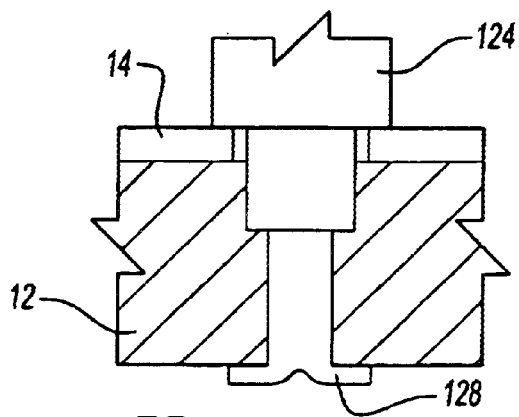
*Fig-3A*
*Fig-3B*

ASSEMBLY FOR ATTACHING A WINDOW REGULATOR MOTOR TO A WINDOW REGULATOR MECHANISM THROUGH A DOOR PANEL

BACKGROUND OF THE INVENTION

The present invention relates to assemblies, and in particular door panel assemblies of land vehicles such as cars (automobiles).

Known cars include doors having windows. It is possible to lower and raise a window glass in order to open and close the window. The vertical position of the window glass is controlled by a window regulator, parts of which are generally secured to a lower edge of the window glass.

Several different forms of window regulator are known. The window glass and the window regulator are positioned in a cavity within the door and are attached to one side (the 'wet' side) of a door panel. The window regulator is driven by components within a window regulator housing mounted on the wet side of the door panel.

A drive mechanism is attached to the other side (the 'dry' side) of the panel opposite to, and in driving cooperation with components of the window regulator housing. The drive mechanism can include a manual arrangement or a powered motor arrangement.

A problem with known door panel assemblies is to ensure alignment of the window regulator housing with the drive mechanism.

SUMMARY OF THE INVENTION

An object of the present invention is to provide an improved form of aligning a first, second and third component of an assembly. The invention is particularly applicable to aligning a window regulator housing (a second component) with a drive mechanism (a third component) when these two components are formed as an assembly with a door panel (a first component). It should be noted that the invention is however applicable to other assemblies where alignment of the components is required.

A further object of the present invention is to provide an improved method of assembling the first, second and third component. A further object of the present invention is to provide an improved form of partially disassembling a first, second and third component of an assembly.

Thus according to the present invention there is provided an assembly including a first, second and third component having respective first, second and third holes. The assembly further includes a locating feature assembled into the first, second and third holes having at least a small diameter cylindrical portion concentric relative to a large diameter cylindrical portion to provide a shoulder. The locating feature further includes a fixing portion proximate the small diameter portion for securing the second component relative to the assembly and a fixing portion proximate the large diameter portion for securing the third component relative to the assembly. The small diameter cylindrical portion is located in the second hole to align the locating feature relative to the second component, and a large diameter portion is located in the third hole to align the locating feature relative to the third component, thereby aligning the second component relative to the third component. The first component is situated between the second and third component and also between the shoulder and the second component.

BRIEF DESCRIPTION OF THE DRAWINGS

The invention will now be described, by way of example only, with reference to the accompanying drawing in which:

FIG. 1 is a schematic view of an assembly according to the present invention;

FIG. 2 shows the locating feature of FIG. 1; and

FIGS. 3A and 3B show an alternative form of the assembly according to the present invention.

DETAILED DESCRIPTION OF THE PREFERRED EMBODIMENT

FIGS. 1 and 2 illustrate a door panel assembly 10 including a window regulator housing 12 (a second component), a door panel 14 (a first component) and a drive mechanism in the form of a window regulator motor 16 (a third component). In further embodiments, the drive mechanism could be in the form of a manual window winder.

The door panel 14 can be in the form of a door inner skin i.e. a pressed component having various holes and attachment features for components such as door hinges, door latch, audio speaker, window regulator motors etc. Alternatively, the door panel 14 can be in the form of a door module panel i.e. a panel onto which various components such as a window regulator motor, an audio speaker, a door latch etc. is premounted with the pre-assembled door module being mounted in a relatively large aperture of a door inner skin.

The window regulator housing 12 might typically contain a drum around which a cable is wound, and rotation of the drum causes movement of the cable and hence raising and lowering of the window glass via separate components of the window regulator. Note that the present invention is not restricted to window regulators containing drums with cables.

In particular it should be noted that the arrangement shown in FIG. 1 enables power generated by the window regulator motor 16 to be transferred across the door panel to the window regulator to enable raising and lowering of the window. The window regulator motor 16 includes a through hole 16A and the door panel 14 includes a through hole 14A.

The window regulator housing 12 includes a blind hole 12A having a parallel sided portion 18 and a tapered portion 20. The large diameter end of the tapered portion 20 is smaller in diameter than the diameter of the parallel sided portion 18, providing a shoulder 22 in the blind hole 12A. In further embodiments, the blind hole 12A could include a parallel sided portion in place of the tapered portion 20, preferably being of smaller diameter than the parallel sided portion 18.

The door panel assembly 10 also includes a locating feature 24 having a large diameter portion D and small diameter portion d which are concentric relative to each other. A shoulder 26 is provided between the large and small diameter portions D and d. A tapered threaded portion 28 is at the end of the small diameter portion d remote from the shoulder 26. At the end of the large diameter portion D is a parallel sided threaded portion 30 onto which a nut 32 can be screwed. A slot 31 is at the end of the parallel threaded portion 30 remote from the shoulder 26.

It should be noted that the large and the small diameter portions D, d are designed to be concentric relative to each other. However, manufacturing techniques result in slight eccentricities of the large diameter portion D relative to the small diameter portion d. However, the design of the large and small diameter portions D, d means that manufacturing techniques, such as turning, allow the eccentricities of the large and small diameter portions D and d be minimized. Note that manufacture of the locating feature 24 is not limited to making this component as a turned component.

The door panel assembly 10 can be assembled in two distinct manners. In a first method of assembly, the window regulator housing 12 can be aligned relative to the door panel and the locating feature 24 (absent the nut 32) can be inserted through the through hole 14A and into the blind hole 12A. The locating feature 24 can then be rotated by a screwdriver that engages the slot 31 such that the tapered threaded portion 28 engages the tapered portion 20 of the blind hole 12A. In this case, the tapered portion 20 is initially plain sided i.e., it does not include threads, and as the locating feature 24 is screwed into the blind hole 12A, the tapered threaded portion 28 self taps a thread into the material of window regulator housing 12. In one example, the window regulator housing 12 is made of plastic. Such an arrangement provides for a subassembly including the locating feature 24 which secures the door panel 14 to the window regulator housing 12.

It should be noted that the length L of the small diameter portion 4 can be slightly less than or slightly greater than tho height H of the parallel sided portion 18 plus the thickness T of the door panel 14. The former case provides for a subassembly in which the door panel 14 is clamped to the window regulator housing 12. The latter case provides for an arrangement whereby the shoulder 26 abuts the shoulder 22, and the door panel 14 is not clamped relative to the window regulator housing 12. The window regulator motor 16 can then be assembled onto the large diameter portion D and the nut 32 can be threaded onto the parallel sided threaded portion 30 and tightened to provide the complete door panel assembly 10.

The second method of assembling the components is to be preassemble the nut 32 onto the locating feature 24, align the window regulator housing 12, the door panel 14 and the window regulator motor 16, sequentially insert the locating feature 24 through the holes 16A, 14A and 12A, and tighten via the slot 31 to secure the door panel assembly 10 in one operation. Using the second method is particularly useful when initially assembling the door panel assembly 10.

The first method is particularly useful when the window regulator motor 16 requires removal or replacement. The nut 32 can be removed, the window regulator motor 16 can be removed, and a replacement window regulator motor can then be assembled without having to move the locating feature 24 from the holes 12A and 14A. Thus, it is not required to disturb the connection between the door panel 14 and the window regulator housing 12.

The small diameter portion d is a relatively snug fit within the parallel sided portion 18. and the large diameter portion D is a relatively snug fit within the through hole 16A. Thus, by controlling the dimensions and manufacturing tolerances on the large and small diameter portions D and d and also on the through holes 16A and the parallel sided portion 18, it is possible to align the window regulator housing 12 with the window regulator motor 16 relatively accurately. In particular, it is often necessary to align the window regulator housing 12 and the window regulator motor 16 relative to each other more accurately than they are aligned relative to the door panel 14, and it will be noted from FIG. 1 that the through hole 14A is of significantly larger diameter than the blind hole 12A. Thus, under certain installations the dimensional accuracy of the through hole 14A can be relaxed to provide a cheaper door panel assembly 10.

The door panel assembly 10 of the window regulator motor 16, the door panel 14 and the window regulator housing 12 as described above includes a single locating feature 24. However, preferably, a plurality of locating features 24 can be assembled into the appropriate holes to provide the door panel assembly 10. Preferably two or three locating features 24 are used. Where a plurality of locating features 24 are used at spaced part locations, the locating features 24 ensure that the first, second and third components cannot move relative to each other.

However, it should be noted that where only a single locating means 24 is used then further devices such as tabs, pips, recesses, pins etc can be used to ensure the first, second and third components are fixed relative to each other, in particular to ensure that none of the first, second or third components can be rotated about the axis of the locating features 24.

Whilst the locating feature 24 has been provided with a drive formation in the form of a slot 31, alternatively drive formations such as hexagonal recesses, hexagonal projections, Torx formations or other suitable drive formations can be provided.

FIGS. 3A and 3B show an alternative form of the door panel assembly 10 according to the present invention in which the tapered threaded portion 28 of FIG. 2 has been replaced with a rivet 128 which is integral with the locating means 124. FIG. 3A shows the rivet having just been inserted through door panel 14 and window regulator housing 12, and FIG. 3B shows the rivet 128 peened over such that door panel 14, window regulator motor 16 and locating feature 124 are retained as a subassembly.

Furthermore it is possible to seal the door panel assembly 10 e.g. by providing a seal between the window regulator housing 12 and the door panel 14, or alternatively by providing a seal between the window regulator motor 16 and the door panel 14.

Whilst it is possible to provide a door panel assembly according to the present invention comprising components other than door panels 14, window regulator mechanisms and window regulator motors 16, the invention is particularly applicable to the automotive industry. In particular, the first component can be a body pressing panel or other sheet metal component of a car.

Whilst it is possible to provide an assembly 10 according to the present invention including components other than door panels 14, window regulator mechanisms and window regulator motors 16, the invention is particularly applicable to the automotive industry. In particular, the first component can be a body pressing panel or other sheet metal component of a car.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. An assembly comprising:
   a door panel including a first hole;
   a window regulator housing including a second hole;

a window regulator motor including a third hole;

a locating member assembled into the first hole, the second hole, and the third hole, the locating member including a small diameter cylindrical portion and a large diameter cylindrical portions, with the small diameter cylindrical portion concentric relative to the large diameter cylindrical portion to provide a shoulder, the locating member further including a first fixing portion near the small diameter cylindrical portion to secure the window regulator housing relative to the assembly and a second fixing portion near the large diameter portion to secure the window regulator motor relative to the assembly, the small diameter cylindrical portion being located in the second hole and aligns the locating member relative to the window regulator housing and the large diameter portion being located in the third hole and aligns the locating member relative to the window regulator motor, thereby aligning the window regulator housing relative to the window regulator motor, and wherein the door panel is located between the window regulator housing and the window regulator motor and between the shoulder and the window regulator housing.

2. The assembly as defined in claim 1 wherein one of the first fixing portion and the second fixing portion includes a thread to define a threaded fixing portion.

3. The assembly as defined in claim 2 wherein the threaded fixing portion engages the window regulator housing.

4. The assembly as defined in claim 2 wherein the threaded fixing portion engages the window regulator motor.

5. The assembly as defined in claim 2 wherein the threaded fixing portion includes parallel sides.

6. The assembly as defined in claim 1 wherein the door panel is sealed relative to the window regulator motor.

7. The assembly as defined in claim 1 wherein the locating member further includes a driving formation.

8. The assembly as defined in claim 1 wherein the door panel, the window regulator housing and the window regulator motor are fixed relative to each other.

9. The assembly as defined in claim 8 further including a second locating member, and the locating member and the second locating member fix the door panel, the window regulator housing and the window regulator motor relative to each other.

10. The assembly as defined in claim 1 wherein the first fixing portion is a rivet.

11. The assembly as defined in claim 1 further including a nut, and wherein the second fixing portion engages the nut.

12. The assembly as defined in claim 1 wherein the small diameter cylindrical portion of the locating member is located in the first hole of the door panel.

13. The assembly as recited in claim 1 wherein both the first fixing portion and the second fixing portion are threaded.

14. The assembly as defined in claim 1 wherein the window regulator housing is aligned relative to the window regulator motor more accurately than the locating member is aligned relative to the door panel.

15. The assembly as defined in claim 1 wherein at least one of the second hole and the third hole is a through hole.

16. The assembly as defined in claim 1 further including a nut that releasably clamps the window regulator motor against the door panel, and wherein the second fixing portion includes a threaded portion engagable by the nut.

17. The assembly as recited in claim 16 wherein the second fixing portion further includes a driving formation that is used to apply a torque to the locating member, and the driving formation is located at an end of the locating member remote from the shoulder.

18. The assembly as defined in claim 1 wherein the second hole is a blind hole.

19. The assembly as defined in claim 1 wherein the door panel is sealed relative to the window regulator housing.

20. The assembly as defined in claim 1 wherein the first fixing portion comprises a tapered, threaded fixing portion.

\* \* \* \* \*

UNITED STATES PATENT AND TRADEMARK OFFICE
CERTIFICATE OF CORRECTION

PATENT NO. : 6,848,215 B2
DATED : February 1, 2005
INVENTOR(S) : Lawrie et al.

It is certified that error appears in the above-identified patent and that said Letters Patent is hereby corrected as shown below:

Column 6,
Line 35, "scaled" should read as -- sealed --.

Signed and Sealed this

Third Day of May, 2005

JON W. DUDAS
*Director of the United States Patent and Trademark Office*